United States Patent
Linares et al.

(10) Patent No.: US 9,221,479 B2
(45) Date of Patent: Dec. 29, 2015

(54) TRAIN AND METHOD FOR SAFELY DETERMINING THE CONFIGURATION OF SUCH A TRAIN

(71) Applicants: Michael Linares, Colombes (FR); Jean-Christophe Van Den Hende, Puteaux (FR)

(72) Inventors: Michael Linares, Colombes (FR); Jean-Christophe Van Den Hende, Puteaux (FR)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 95 days.

(21) Appl. No.: 13/928,183

(22) Filed: Jun. 26, 2013

(65) Prior Publication Data

US 2014/0005863 A1    Jan. 2, 2014

(30) Foreign Application Priority Data

Jun. 27, 2012 (FR) ...................................... 12 56126

(51) Int. Cl.
    *G06F 7/00*            (2006.01)
    *B61D 17/00*        (2006.01)
    (Continued)

(52) U.S. Cl.
    CPC .......... *B61L 15/0072* (2013.01); *B61L 15/0036* (2013.01); *B61L 25/028* (2013.01); *Y02B 60/43* (2013.01); *Y02B 60/44* (2013.01)

(58) Field of Classification Search
CPC ............ B61L 15/0036; B61L 15/0072; B61L 25/028; B32B 2255/00; B32B 2255/02; B32B 2255/06; B32B 2255/10; B32B 2260/021; B32B 2260/046; B32B 2266/0207; B32B 2266/0214; B32B 2266/0278; B32B 2307/50; B32B 2307/54; B32B 27/40; B32B 5/022; B32B 5/024; B32B 5/18; B32B 5/20; C08F 2/32; C08G 18/28; C08J 2201/0484; C08J 2201/0504; C08J 2205/04; C08J 2375/04; C08J 9/28; Y02B 60/43; Y02B 60/44
USPC ............ 701/19, 20; 105/1.4, 26.05; 246/6, 14
See application file for complete search history.

(56) References Cited

U.S. PATENT DOCUMENTS 5,777,547 A *    7/1998    Waldrop ....................... 340/438
7,725,252 B2 *    5/2010    Heddebaut et al. ........... 701/408
(Continued)

FOREIGN PATENT DOCUMENTS

EP      1013533 A1      6/2000
EP      1306283 A2      2/2003
(Continued)

OTHER PUBLICATIONS

Kirrmann, Hubert, and Pierre A. Zuber. "The IEC/IEEE train communication network." IEEE Micro 21.2 (2001): 81-92.*

*Primary Examiner* — Fadey Jabr
*Assistant Examiner* — Angelina Shudy
(74) *Attorney, Agent, or Firm* — Davidson, Davidson & Kappel, LLC

(57) ABSTRACT

A method for determining the configuration of a train is provided. The train includes one safety management' device per unit, each device having two designated identifiers, one coupling communication for each pair of adjacent unit and a general network for connecting all the devices to each other. The method includes transmitting, over the general network and over each coupling communication link, with at least one device, a secured message to one of the adjacent devices to the device, the message including one of the identifiers of the device transmitting, over the general network, with each device having received an identifier of another connected through a coupling communication link, at least one restoration message including both identifiers of the device as well as the received identifier, receiving, with each device, the transmitted restoration messages, and determining, with at least one device, the configuration of the train.

5 Claims, 4 Drawing Sheets

(51) Int. Cl.
  *B61C 17/00* (2006.01)
  *B61L 15/00* (2006.01)
  *B61L 21/08* (2006.01)
  *B61L 25/02* (2006.01)

(56) References Cited

U.S. PATENT DOCUMENTS

| | | | |
|---|---|---|---|
| 8,755,957 B2 * | 6/2014 | Chenu | 701/19 |
| 8,902,789 B2 * | 12/2014 | Maruta et al. | 370/254 |
| 2003/0040853 A1 * | 2/2003 | Brousseau et al. | 701/19 |
| 2004/0245410 A1 * | 12/2004 | Kisak et al. | 246/3 |
| 2005/0065682 A1 * | 3/2005 | Kapadia et al. | 701/35 |
| 2006/0180709 A1 * | 8/2006 | Breton et al. | 246/1 C |
| 2006/0282563 A1 * | 12/2006 | Son | 710/38 |
| 2009/0204278 A1 * | 8/2009 | Kellner et al. | 701/19 |
| 2011/0130899 A1 * | 6/2011 | Beaurent et al. | 701/19 |
| 2012/0150370 A1 * | 6/2012 | Oldknow et al. | 701/19 |
| 2013/0245865 A1 * | 9/2013 | Chenu | 701/19 |
| 2013/0304286 A1 * | 11/2013 | Ehrler et al. | 701/19 |
| 2014/0109240 A1 * | 4/2014 | Pomerantz et al. | 726/27 |
| 2014/0177835 A1 * | 6/2014 | Fischer | 380/210 |
| 2015/0025716 A1 * | 1/2015 | Orion | 701/19 |

FOREIGN PATENT DOCUMENTS

| | | |
|---|---|---|
| EP | 1403162 A1 | 3/2004 |
| WO | 2012069223 A1 | 5/2012 |
| WO | WO2012069223 A1 * | 5/2012 |

* cited by examiner

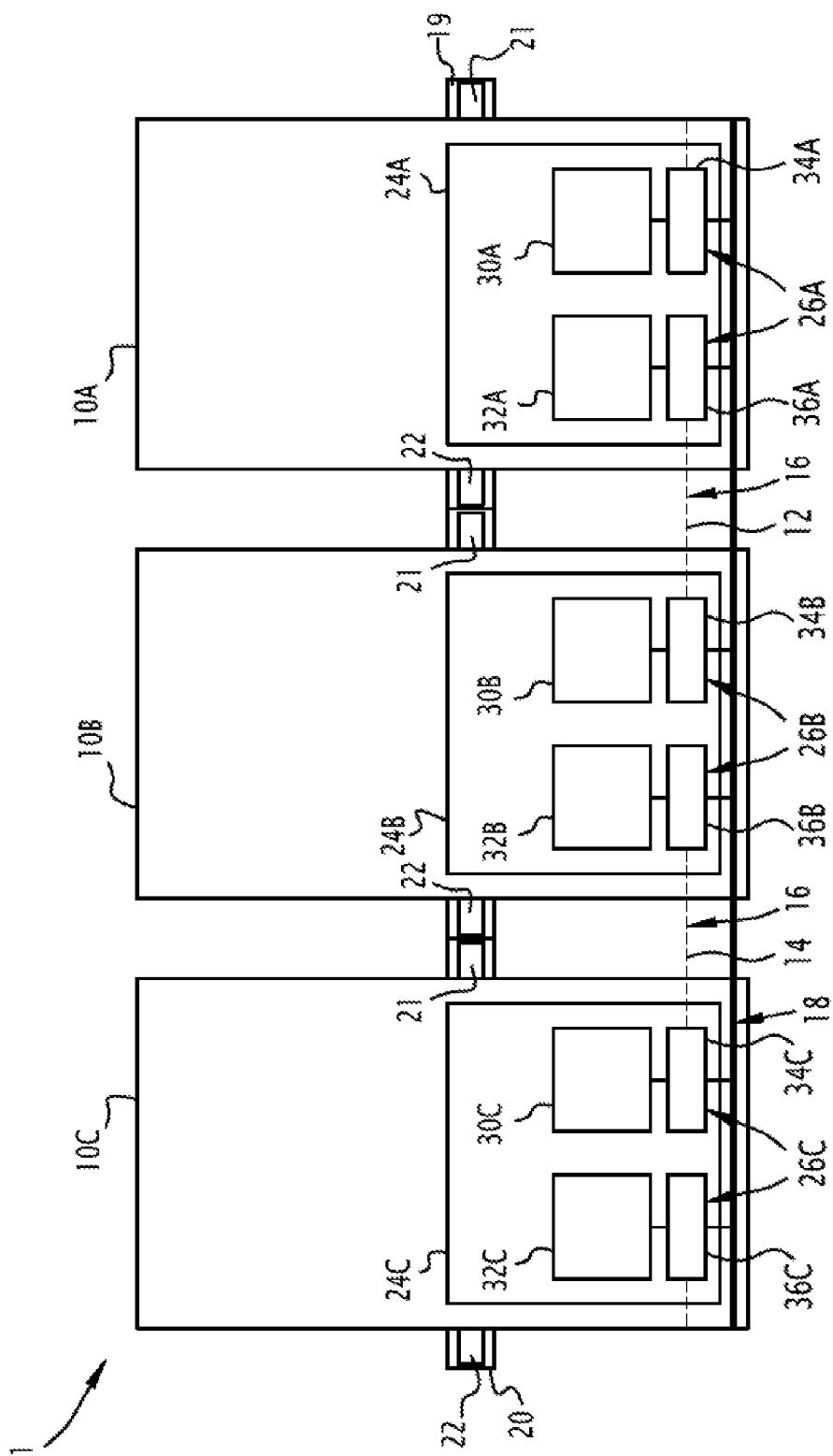

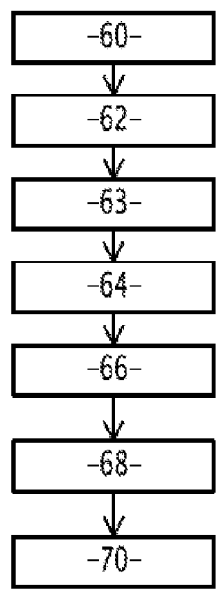
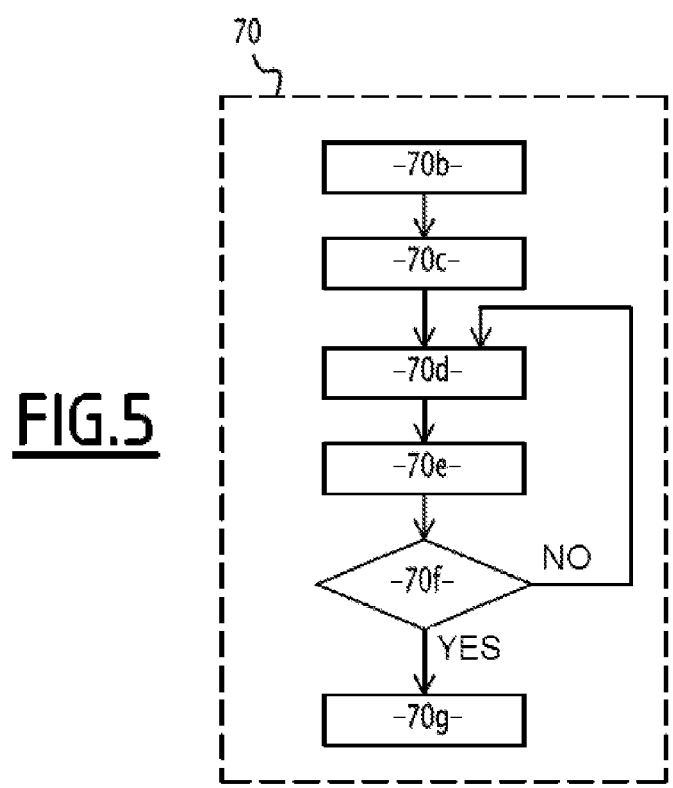
FIG.4
FIG.5

TRAIN AND METHOD FOR SAFELY DETERMINING THE CONFIGURATION OF SUCH A TRAIN

Priority is hereby claimed to FR 12 56126 filed on Jun. 27, 2012, the entire disclosure of which is hereby incorporated by reference herein.

The present invention relates to a train and a method for determining the configuration of a train including a plurality of vehicles grouped in successive units connected together, among which are a head unit and a tail unit.

BACKGROUND OF THE INVENTION

In the following of the document, a unit designates a set of interdependent and non-separable vehicles.

Each unit of a train includes a module capable of ensuring that the different functions relating to the safety of the train are fulfilled, such as for example the calculation of the speed of the train, the handling of the opening of the doors or further emergency breaking. Another primary function which also relates to the safety of the train, consists of being able to determine the configuration of the train, in other words the order according to which the units are connected to each other. Fulfillment of this function allows the train to know its length, the knowledge of this parameter being essential during the crossing of reversal switches, or further know the mass distribution of its units, which is notably useful for parameterization of the features of the train.

This determination of the configuration of the train is achieved before starting the train, when it is at a standstill, and is conventionally carried out by safety equipment installed on the ground, and able to determine the relative position of the units. Such pieces of safety equipment for example include radio transmitters, track sensors and/or circuits, operating autonomously or as a combination with each other. These pieces of equipment then transmit the configuration of the train to the train itself, the train then checks its configuration by reading coupling electric couplers installed between each unit, and able to determine, for each unit of the train, the presence or the absence of an adjacent unit.

SUMMARY OF THE INVENTION

An object of the present invention may include a method for safely determining the configuration of the train, with which it is possible to do without the use of ground equipment.

For this purpose, the present invention provides a method for determining the configuration of a train, the train including a plurality of vehicles grouped in successive units connected together, among which are a head unit and a tail unit, a safety management device per unit, each device having two identifiers which are specific to it, a coupling communication link for each pair of adjacent units, each coupling communication link only connecting two devices of adjacent units and a general network connecting all the devices together, the method comprising an initial step of transmitting with each device over the general network, a non-secured broadcast message including both of its identifiers, and a step of receiving, with each device, messages including the identifiers of the other devices the method further comprising the following steps:

transmitting over the general network and over each coupling communication link, with at least one device, a secured message to one of the adjacent devices to said device, the message including one of the identifiers of said device, transmitting over the general network with each device having received an identifier from another device connected through a coupling communication link, at least one restoration message including both identifiers of said device as well as the received identifier, receiving, with each device, transmitted restoration messages, and determining, with at least one device, the configuration of the train, said determination step consisting in applying a predetermined algorithm within said device.

According to other advantageous aspects of the invention, the method may include one or more of the following features, taken individually or according to all the technically possible combinations:

each unit further includes two coupling electric couplers, each coupling electric coupler being able to detect the presence of another unit, connected to said unit and during the step for determining the configuration of the train, the determination algorithm includes the following step:

seeking an assumed tail device of the train by identification of the two devices which are only connected to a single other device, via a coupling communication link and the selection of one of these two devices, seeking a second device connected to the assumed tail device via a coupling communication link, iterating the preceding step, step by step, as far as the other device which is only connected to a single other device via a coupling communication link, said other device forming the assumed head device, and validating the completeness of the train, the assumed head and tail units, respectively corresponding to the assumed head device and to the assumed tail device, having to be confirmed as ends of the train by reading the corresponding coupling electric couplers;

each device includes two safety management modules, each module having an identifier which is specific to it, and, during the initial step for transmitting, with each device, over the general network, a non-secured broadcast message including both of its identifiers, and during the step for transmitting, with each device, over the general network, at least one restoration message including both of its identifiers as well as the received identifier, said two identifiers are the identifiers of the two safety management modules which it includes, each module transmitting its own identifier over the general network;

each device includes a safety management module, each module having two identifiers which are specific to it, and during the initial step for transmitting, with each device, over the general network, a non-secured broadcast message including both of its identifiers, and during the step for transmitting, with each device over the general network, at least one restoration message including both of its identifiers as well as the received identifiers, said two identifiers are the identifiers of the safety management module which it includes;

during the step for transmitting, with each device, over the general network, at least one restoration message including both of its identifiers as well as the received identifiers, two devices further transmit in parallel over the general network, a message including both of their identifiers as well as the value of a variable indicative of the presence or absence of an adjacent unit.

The present invention also provides a train, wherein in each device, the means for processing messages are further capable of elaborating a restoration message including both identifiers of the device as well as one of the identifiers of a device of an adjacent unit, and wherein at least one device further includes means for determining the configuration of the train.

According to other advantageous aspects of the invention, the train may include one or more of the following features, taken individually or according to all the technically possible combinations:
- the means for determining the configuration of the train include second memory storage means and means for executing an algorithm, the second memory storage means being capable of storing an algorithm for determining the configuration of the train, the execution means being capable of applying said algorithm for determining the configuration of the train;
- each device further includes two safety management modules, each module having an identifier which is specific to it;
- each device further includes a safety management module, said module having two identifiers which are specific to it;
- the first memory storage means are further capable of storing at least one variable, the value of which indicates the presence or the absence of an adjacent unit, the means for processing messages being further capable of elaborating a message including both identifiers of the device as well as the value of said variable;
- the general network is a network of the Ethernet type;
- each unit further includes two coupling electric couplers, each coupling electric coupler being capable of detecting the presence of another unit, connected to said unit;
- each coupling communication link is compliant with the IEEE-802.1q standard or with the IEEE-802.1ab standard;
- the means for processing messages are further capable of elaborating a message including the configuration of the train provided by the means for determining the configuration of the train.

BRIEF DESCRIPTION OF THE DRAWINGS

These features and advantages of the invention will become apparent upon reading the description which follows, only given as a non-limiting example and made with reference to the appended drawings, wherein:

FIG. 2 is a schematic illustration of the units of the train of FIG. 1, each unit including a safety management device, each device comprising two safety management modules, FIG. 4 is a flow chart illustrating a method for determining the configuration of a train according to the first embodiment of the invention, applied by each safety management module of FIG. 2, FIG. 5 is a flow chart illustrating a step for applying, with each safety management module, a predetermined algorithm in its midst, the step stemming from the method of FIG. 4.

DETAILED DESCRIPTION OF PREFERRED EMBODIMENTS

Figure 1:
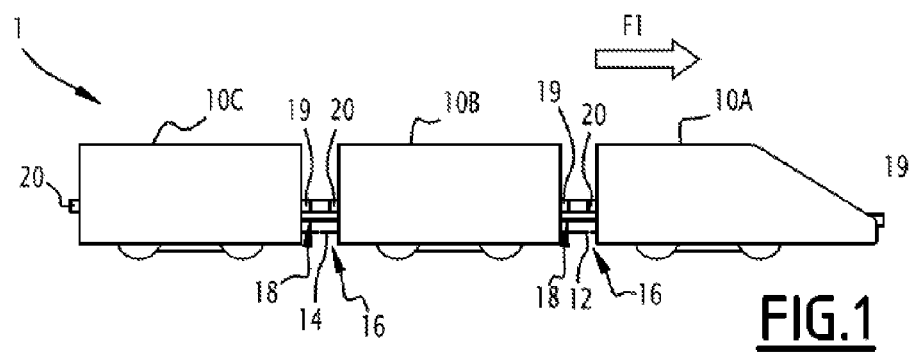
FIG. 1 is a schematic illustration of a train according to a first embodiment of the invention, the train comprising three units.

FIG. 1 illustrates a railway train 1 according to a first embodiment of the invention. The train 1 includes a first rolling unit 10A, a second rolling unit 10B and a third rolling unit 10C, the second unit 10B being mechanically connected between both units 10A, 10C. The first unit 10A is the head unit of the train 1 and the third unit 10C is the tail unit of the train 1.

For communications, the train 1 further includes a first coupling communication link 12 and a second coupling communication link 14. Each coupling communication link 12, 14 connects two adjacent units from among the units 10A, 10B, 10C. More specifically, the first coupling communication link 12 connects the unit 10A and 10B, and the second coupling communication link 14 connects the units 10B and 10C. Both coupling communication links 12, 14 form a set 16 of coupling communication links. The train 1 further includes a general network 18 connecting the units 10A, 10B, 10C, together. The set 16 of coupling communication links and the general network 18 are used for transmitting logic data or information within the train 1.

In the following of the description, the terms of "front" and "rear" are meant with respect to the advance direction of the train 1, from the rear to the front according to the arrow F1 in FIG. 1.

As known per se, each unit 10A, 10B, 10C includes a front coupling 19 and a rear coupling 20, in order to ensure the mechanical connection with an adjacent unit 10A, 10B, 10C. As illustrated in FIG. 2, each front coupling 19 includes a front coupling electric coupler 21 and each rear coupling 20 includes a rear coupling electric coupler 22. Each unit 10A, 10B, respectively 10C, further includes a safety management device 24A, 24B, respectively 24C, capable of ensuring that the different functions related to the safety of the train 1 are fulfilled, and comprising means, for example, transmitters, 26A, 26B, respectively 26C, for transmitting data.

The coupling communication link 12, respectively 14, connects the device 24B, respectively 24A, to the device 24C. More specifically, the coupling communication link 12, respectively 14, connects the data transmitter 26B to transmitters 26A, respectively 26C, for transmitting data, as described in detail subsequently.

Each coupling communication link 12, 14 is for example an Ethernet wired link according to the IEEE-802.1q standard, generally called a VLAN link. Alternatively, each coupling communication link 12, 14 is an Ethernet wired link compliant with the IEEE-802.1ab standard, generally called an Ethernet link with frames of the "network discovery" type.

Still alternatively, each coupling communication link 12, 14 is a wired link other than an Ethernet wired link, such as a specific serial link for example.

Still alternatively, each coupling communication link 12, 14 is a wireless link such as for example a radiofrequency link, or further an optical or magnetic coupling link.

The coupling communication link 12, respectively 14, is capable of circulating logic data or information from the device 24A, respectively 24C, towards the device 24B, and conversely, from the device 24B to the device 24A, respectively 24C.

The general network 18 connects the devices 24A, 24B, 24C with each other. More specifically, the general network 18 connects the data transmitters 26A, 26B, 26C together, the general network 18 is for example an Ethernet network. The general network 18 is capable of circulating logic data or information from a device 24A, 24B, 24C towards another device 24A, 24B, 24C.

Each coupling electric coupler 21, 22 of a unit 10A, 10B, respectively 10C, is connected to the device 24A, 24B, respectively 24C, corresponding to the unit. In the exemplary embodiment described, each coupling electric coupler 21, 22 of a unit 10A, 10B, respectively 10C, notably comprises electric contacts capable of detecting the presence of another unit connected to said unit 10A, 10B, respectively 10C. It is capable of safely transmitting to the device 24A, 24B, 24C to which it is connected, information of the presence or on the absence of a unit 10A, 10B, 10C. This presence or absence information appears in the form of two variables, one of the variables indicating the free state or not of the associated coupling, the other variable indicating the occupied state or not of the associated coupling.

Each device 24A, 24B, respectively 24C, further includes a safety management front module 30A, 30B, respectively 30C, as well as a safety management rear module 32A, 32B, respectively 32C. Each device 24A, 24B, 24C includes in memories two identifiers which are specific to it, as described subsequently.

In the exemplary embodiment, the transmitters 26A, 26B, respectively 26C, for transmitting data include a front switch 34A, 34B, respectively 34C, and a rear switch 36A, 36B, respectively 36C. Each switch 34A, 34B, 34C, 36A, 36B, respectively 36C, is connected to a module 30A, 30B, 30C, 32A, 32B, respectively 32C, on the one hand and to the general network 18 on the other hand. Each switch 34A, 34B, 34C, 36A, 36B, 36C is further connected to the front 21 and rear 22 coupling electric couplers of the unit in which it is installed. The rear switch 36A, respectively 36B, is further connected via the coupling communication link 12, respectively 14, to the front switch 34B, respectively 34C.

Each switch 36A, 34B, 36B, 34C is capable of transmitting a message to the sole switch to which it is connected via a coupling communication link 12, 14 as well as receiving a message from this same switch, and of sending it to the module to which it is connected. Each switch 34A, 34B, 34C, 36A, 36B, 36C is moreover capable of transmitting a message to every other switch, over the general network 18. Each switch 34A, 34B, 34C, 36A, 36B, 36C is further capable of receiving a message from another switch, over the general network 18 and of sending it to the module to which it is connected.

Alternatively, the switches 34A, 34B, 34C, 36A, 36B, 36C are replaced with any data transmission means on a wired or wireless network.

The front modules 30A, 30B, 30C and the rear modules 32A, 32B, 32C all have the same structure. Subsequently, only the structure of the rear module 32A will therefore be described.

Figure 3:
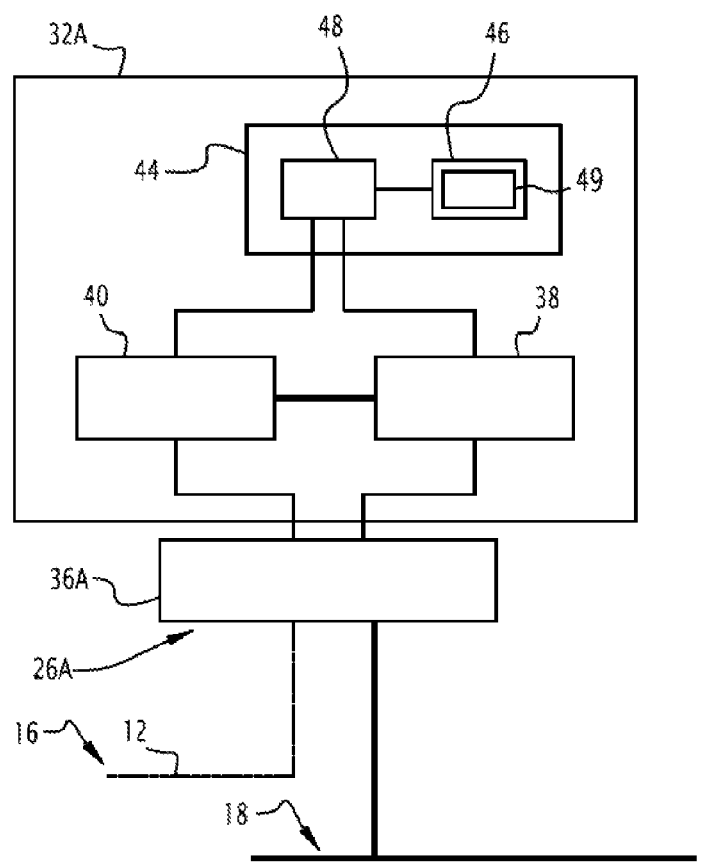
FIG. 3 is a schematic illustration of one of the safety management modules of FIG. 2.

As illustrated in FIG. 3, the rear module 32A includes first memory storage 38 and a processor 40 for processing messages, connected to the first memory storage 38. The rear module 32A also includes a module 44 for determining the configuration of the train 1, connected to the first memory storage 38 and to the processor 40 for processing messages.

The first memory storage 38 is connected to the rear switch 36A and is for example formed with re-writable non-volatile memory, known per se. The storage 38 is capable of storing an identifier $Id_{32A}$, specific to the rear module 32A. The first memory storage 38 is also capable of storing identifiers and pairs of identifiers transmitted by the rear switch 36A. The pairs of identifiers stored by the first memory storage 38 are called coupling identifier pairs subsequently. The first memory storage 38 is in particular capable of storing the identifier $Id_{30B}$ specific to the front module 30B. They are further capable of storing the variables, the value of which indicates the free or occupied state of the rear coupling 20 of the first unit 10A. Both identifiers of each device 24A, 24B, 24C are the identifiers of two safety management modules which it includes.

The processor 40 for processing messages is connected to the rear switch 36A and is for example formed with a data processor, known per se. The processor 40 for processing messages is capable of transmitting a message towards the other modules through the rear switch 36A. The processor 40 for processing messages is capable of elaborating a broadcast message including the identifier $Id_{32A}$. The processor 40 is also capable of elaborating a restoration message including the identifier $Id_{32A}$, the identifier of the module belonging to the same device as the rear module 32A, the identifier of the module connected to the module 32A via a coupling communication link, and the value of one of the variables stored in the first memory storage 38. In particular, the processor 40 for processing messages are capable of elaborating a restoration message including the identifier $Id_{32A}$, the identifier $Id_{30A}$, the identifier $Id_{30B}$ and the value of one of the variables indicating the free or occupied state of the rear coupling 20 of the first unit 10A. The processor 40 for processing messages is also capable of elaborating a message including the configuration of the train 1. The processor 40 for processing messages is further capable of elaborating a request for confirming the presence of a unit to a coupling electric coupler 21, 22.

The module 44 for determining the configuration of the train 1 includes second memory storage 46 and a computer 48 for executing an algorithm, connected to the second memory storage 46.

The second memory storage 46 is for example formed with re-writable non-volatile memory. The storage 46 includes a restoration table 49, for example formed with a single entry stack, and capable of storing a list of identifiers. The second memory storage 46 is capable of storing an algorithm for determining the configuration of the train 1. The algorithm for determining the configuration of the train 1 will be described subsequently in the corresponding determination method. The second memory storage 46 is capable of storing an identifier $Id_{30A}$, specific to the front module 30A. The storage 46 is also capable of storing pairs of identifiers transmitted by the rear switch 36A and called pairs of identifiers of a unit subsequently. The second memory storage 46 is capable of further storing a first variable, a second variable, a third variable and a fourth variable. The first variable corresponds to a first current identifier and the second variable corresponds to a second current identifier. Further, the third variable corresponds to the identifier of a module of the assumed tail unit of the train 1 and the fourth variable corresponds to the identifier of a module of the assumed head unit of the train 1.

The computer 48 is further connected to the first memory storage 38 and to the processor 40 for processing messages. The computer 48 is capable of applying the algorithm for determining the configuration of the train 1. Further it is capable of comparing stored identifiers one by one, and of seeking an identifier stored in the first memory storage 38 or in the second memory storage 46. The computer 48 is also capable of isolating a pair of identifiers stored in the first memory storage 38 or in the second memory storage 46, and of instantiating and/or updating the first, second, third and fourth variables stored in the second memory storage 46.

Alternatively, each front module 30A, 30B, respectively 30C is connected to a rear module 32A, 32B, respectively 32C, via a communication link internal to the device 24A, 24B, respectively 24C, each communication link for example being a wired link making up a portion of the general network 18.

Alternatively, a single safety management module includes a module 44 for determining the configuration of the train 1.

Still alternatively, at least one safety management module includes a module 44 for determining the configuration of the train 1.

The method for determining the configuration of the train 1, applied by the rear module 32A, will now be described with reference to FIGS. 4 and 5.

Initially, the train 1 is at a standstill and the first memory storage 38 stores the identifier $Id_{32A}$ of the rear module 32A. Further, the second storage 46 is parameterized by an operator, so as to store the identifier $Id_{30A}$ of the front module 30A. The restoration table 49 is empty. The first, second, third and fourth variables include the value "NULL." The three following steps are also applied in parallel by the modules 30A, 30B, 30C, 32B, 32C.

As illustrated in FIG. 4, during an initial step 60, the processor 40 for processing messages from the rear module 32A elaborates a non-secured broadcast message including the isolated identifier $Id_{32A}$, in other words not associated with another identifier. The processor 40 for processing messages transmit, via the rear switch 36A, the non-secured broadcast message over the general network 18, according to a transmission mode known per se of the <<broadcasting>> type.

During a next step 62, the first memory storage 38 receives over the general network 18, via the rear switch 36A, the isolated identifiers $Id_{30A}$, $Id_{30B}$, $Id_{30C}$, $Id_{32B}$, $Id_{32C}$ contained in the non-secured broadcast messages from the modules 30A, 30B, 30C, 32B, 32C. The first memory storage 38 then stores the identifiers $Id_{30A}$, $Id_{30B}$, $Id_{30C}$, $Id_{32B}$, $Id_{32C}$.

During a next step 63, the processor 40 for processing messages of the rear module 32A elaborate several secured messages, each secured message including the identifier $Id_{32A}$ and the identifier of a module different from the rear module 32A. The processor 40 for processing messages thus elaborate a number of secured messages equal to the number of identifiers received during the preceding step 62. The processor 40 for processing messages transmit, via the rear switch 36A, the secured messages over the coupling communication link 12 and over the general network 18, according to a conventional safe transmission mode, of the point-to-point bidirectional link type. During this same step, the means for processing messages of the modules 30A, 32C transmit secured messages at least over the general network 18.

During a next step 64, the first memory storage 38 receives on the coupling communication link 12, via the rear switch 36A, only the identifier $Id_{30B}$ contained in a secured message from the front module 30B. The first memory storage 38 stores a pair of coupling identifiers formed with the identifier $Id_{32A}$ and with the identifier $Id_{30B}$. Step 64 is also applied by each module 30B, 30C and 32B.

During a next step 66, the coupling electric coupler 22 of the unit 10A safely transmits to the device 24A, information on the presence of a unit. The first memory storage 38 then store the values of the corresponding variables respectively indicating the non-free state and the occupied state of the rear coupling 20 of the first unit 10A.

During this same step 66, the processor 40 for processing messages elaborate a restoration message including the identifier of the rear module 32A, the identifier of the module belonging to the same device as the rear module 32A, the identifier of the module connected to the module 32A via a coupling communication link, and the value of one of the variables stored in the first memory storage 38. In the exemplary embodiment, the restoration message includes the identifier $Id_{32A}$, the identifier $Id_{30A}$, the identifier $Id_{30B}$ and the "occupied" value. The processor 40 for processing messages transmits, via the rear switch 36A, the restoration message over the general network 18. Step 66 is also applied in parallel by the modules 30A, 30B, 30C, 32B, 32C. The message processing means of each module 30A, 32C elaborates a restoration message only including the identifier of the module 30A, respectively 32C, the identifier of the module belonging to the same device as the module 30A, respectively 32C, i.e. the identifier of the module 32A, respectively 30C, and the "free" value.

During a next step 68, the computer 48 receives over the general network 18, via the rear switch 36A, the restoration messages from the modules 30A, 30B, 30C, 32B, 32C. The computer 48 then isolates in the received restoration messages, the identifier pairs of modules belonging to a same safety management device. Thus, each isolated pair of identifiers includes the identifiers of the modules of a same unit and forms a pair of identifiers of a unit. For example, one of the pairs of identifiers of one unit is formed with the identifier $Id_{32C}$ and of the identifier $Id_{30C}$. The computer 48 transmits these pairs of identifiers of a unit to the second memory storage means 46, which store them.

In parallel, during this same step 68, the computer 48 isolates, in the restoration messages from the modules 30B, 30C, 32B, the pairs of identifiers of modules connected via a coupling communication link. The computer 48 transmits these pairs of coupling identifiers to the first memory storage 38, which stores them. In the exemplary embodiment, the first memory storage 38 stores two first pairs of coupling identifiers, each of the two first pairs being formed with the identifier $Id_{30C}$ and with the identifier $Id_{32B}$. The first memory storage 38 also stores a third pair of coupling identifiers formed with the identifier $Id_{30B}$ and with the identifier $Id_{32A}$. Step 68 is also applied in parallel by the modules 30A, 30B, 30C, 32B, 32C.

During a next step 70, the computer 48 of the rear module 32A applies the algorithm for determining the configuration of the train 1. This step is illustrated in detail in FIG. 5.

During a step 70b, the computer 48 carries out a comparison between the identifiers stored in the first memory storage 38 and the pairs of coupling identifiers stored in the first memory storage 38. It then isolates the two identifiers which do not appear in any stored pair of coupling identifiers. In the exemplary embodiment, the two identifiers not appearing in any stored pair of coupling identifiers are the identifier $Id_{30A}$ and the identifier $Id_{32C}$. The computer 48 then arbitrarily isolates one of the two identifiers, for example the identifier $Id_{32C}$ and designates it as being the identifier of a module of the assumed tail unit of the train 1. The computer 48 also designates the identifier $Id_{32C}$ as being the first current identifier and transmits it to the second memory storage 46 which stores it in the table 49. The computer 48 designates the identifier $Id_{30A}$ as being the identifier of a module of the assumed head unit of the train 1. Alternatively, the computer 48 designates the identifier $Id_{30A}$ as being the identifier of a module of the assumed tail unit of the train 1, the identifier $Id_{32C}$ being designated as being the identifier of a module of the assumed head unit of the train 1.

During a next step 70c, the computer 48 seeks in the second memory storage 46, the first current identifier from among the pairs of stored unit identifiers. The computer 48 then isolates the pair of unit identifiers including the first current identifier, and isolates the other identifier of this pair, the computer 48 then designating this identifier as being the second current identifier. The computer 48 transmits the second current identifier to the second memory storage 46 which stores it in the table 49.

During a next step 70d, the computer 48 seeks, in the first memory storage 38, the second current identifier from among the stored pairs of coupling identifiers. The computer 48 then isolates the pair of coupling identifiers including the second current identifier and isolates the other identifier of this pair, the computer 48 then designating this identifier as being the first current identifier. The computer 48 transmits the first current identifier to the second memory storage 46, which stores it in the table 49. A next step 70e is then applied by the computer 48, step 70e being identical with step 70c.

During a next step 70f, the computer 48 compares the second current identifier with the identifier designated during step 70b as being the identifier of a module of the assumed head unit of the train 1, in this case the identifier $Id_{30A}$.

If both identifiers are different, step 70d is carried out again.

If both identifiers are the same, a next step 70g is applied by the rear modules 32A as described subsequently.

During step 70g, the processor 40 for processing messages elaborates a message including the contents of the table 49. The processor 40 for processing messages also elaborate during this same step, a request for confirmation of the presence of a unit to the coupling electric coupler 21 of the unit 10A, and to the coupling electric coupler 22 of the unit 10C. The processor 40 for processing messages transmits, via the rear switch 36A, the message including the contents of table 49, as well as the request for confirmation of the presence to the coupling electric coupler 22 of the unit 10C, over the general network 18. The request for confirming the presence of a unit, to the coupling electric coupler 21A of the unit 10A, is directly transmitted by the processor 40 for processing messages to the coupling electric coupler 21, via the rear switch 36A.

In the described example, the coupling electric coupler 21, respectively 22, of the unit 10A, respectively 10C, indicates that no unit is connected to the unit 10A, respectively to the unit 10C. If, during step 70g, at least one of the two queried electric couplers indicates that one unit is connected, the method for determining the configuration of the train 1 is interrupted during step 72, not shown. An operator may then intervene in order to carry out for example a maintenance operation on the coupling communication links and/or the general network.

The algorithm for determining the configuration of the train 1 applied by the computer 48 is interrupted in the case when a given safety management module appears as being connected, via coupling communication links, to two different modules.

Additionally, the method includes an additional step 74 not shown, carried out after step 70g. During this step 74, the processor 40 for processing messages elaborate a request for testing the coupling communication link 12 and a request for testing the coupling communication link 14. The processor 40 for processing messages transmits via the rear switch 36A, the request for testing the coupling communication links 12 to the module 30B, over the general network 18. They also transmit the request for testing the coupling communication link 14 to the modules 32B, 30C, over the general network 18. If during step 74, at least one module indicates that the coupling communication link with which it is associated is faulty, step 72 is carried out.

Alternatively or additionally, the steps 70b, 70c, 70d, 70e, 70f and 70g are applied in parallel by the modules 30A, 30B, 30C, 32B, 32C.

The method for determining the configuration of the train 1 according to this embodiment of the invention thus gives the possibility of doing without the use of ground equipment.

Further, the method for determining the configuration of the train 1 according to this embodiment of the invention does not impose any particular constraints on the safety aspect or not of the coupling communication links 12, 14, unlike the second embodiment described subsequently.

This first embodiment is the preferential embodiment of the invention.

In an alternative embodiment, the safety management modules belonging to a same device are connected through a wired link. Thus, each safety management module has access to the identifier of the module belonging to the same device, and the second memory storage 46 stores this identifier, before applying the method according to the invention. According to this alternative, the second memory storage 46 is not parameterized by an operator.

Still alternatively, the identifiers $Id_{30A}$ and $Id_{32A}$ follow a rule indicating that the front module 30A and the rear module 32A belongs to the device 24A. According to this alternative, the computer 48 is capable of applying, for all the identifiers stored in the first memory storage 38, a rule for recognizing the identifier of the other safety management module belonging to the device 24A, different from the rear module 32A. In the exemplary embodiment, this other module is the front module 30A. According to this alternative, during step 62 for receiving with the first memory storage 38, isolated identifiers $Id_{30A}$, $Id_{30B}$, $Id_{30C}$, $Id_{32B}$, $Id_{32C}$, the computer 48 identifies the identifier $Id_{30A}$, by means of the recognition rule. The computer 48 then transmits this identifier $Id_{30A}$ to the second memory storage 46, which stores it.

Figure 6:
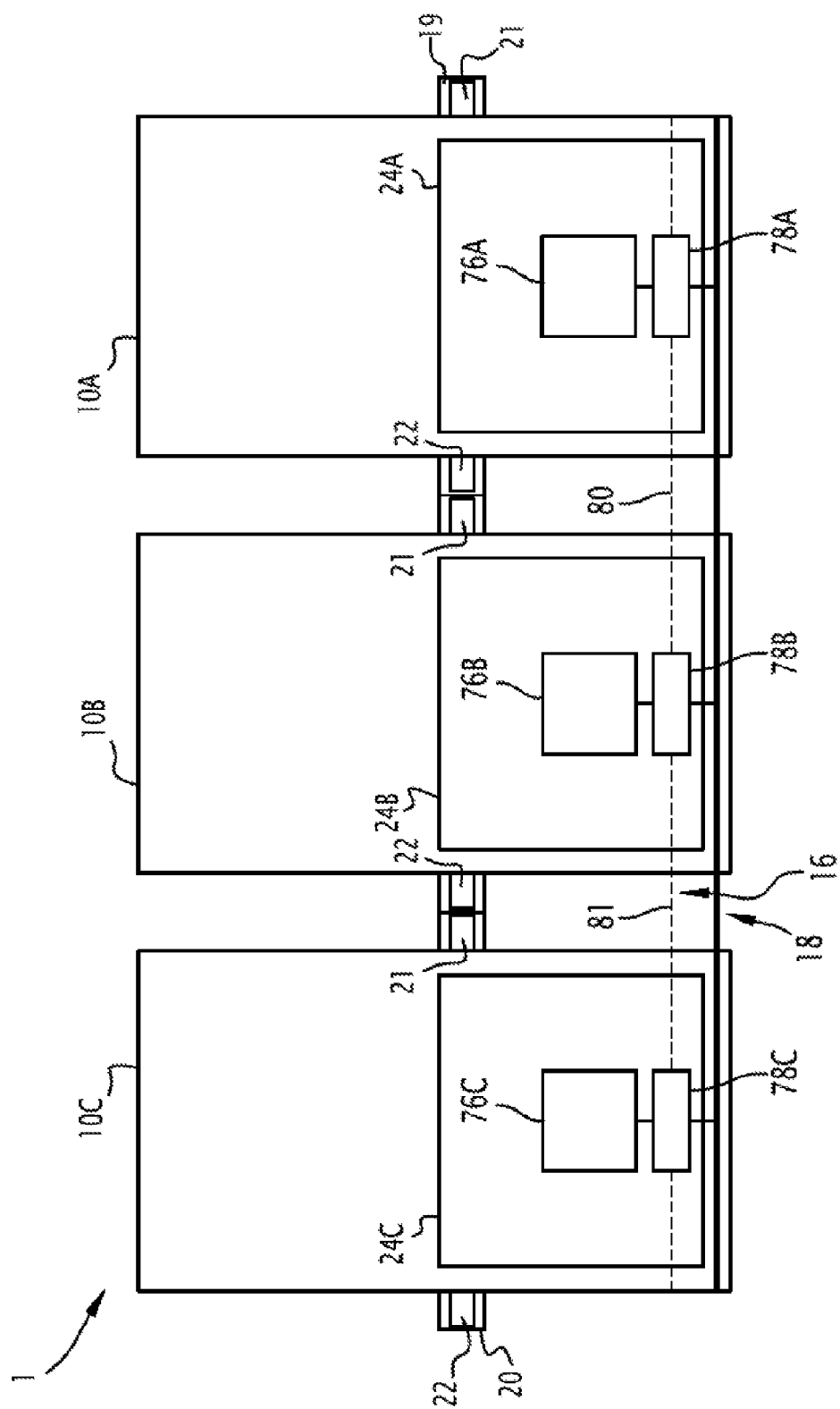
FIG. 6 is a schematic illustration of the units of a train according to a second embodiment of the invention.

FIG. 6 illustrates a second embodiment, for which the elements similar to those of the first embodiment described earlier are marked with identical references.

According to this second embodiment, each safety management device 24A, 24B, respectively 24C, does not include any more a single safety management module 76A, 76B, respectively 76C. Further, the transmitters 26A, 26B, respectively 26C, for transmitting data include a single switch 78A, 78B, respectively 78C.

Unlike the modules of the first embodiment, each module 76A, 76B, 76C includes a front portion having a first identifier and a rear portion having a second identifier. Except for these features, the modules 76A, 76B, 76C are analogous to the modules 30A, 30B, 30C, 32A, 32B, 32C of the first embodiment.

Each switch 78A, 78B, respectively 78C, is connected to a module 76A, 76B, respectively 76C, on the one hand and to the general network 18 on the other hand. The switch 78A, respectively 78C, is further connected, via a coupling communication link 80, respectively 81, to the switch 78B. Unlike the switches of the first embodiment, each switch 78A, 78B, 78C is capable of transmitting a message to said or each switch to which it is connected via a coupling communication link 80, 81 as well as of receiving a message from this(these) switch(es), and sending it to the module to which it is connected. Except for this characteristic, the switches 78A, 78B, 78C are analogous to the switches 34A, 34B, 34C, 36A, 36B, 36C of the first embodiment.

Alternatively, the switches 78A, 78B, 78C are replaced with any means for transmitting data over a wired or wireless network.

Still alternatively, each of the transmitters 26A, 26B respectively 26C, for transmitting data includes a front switch and a rear switch, the front and rear switch being connected to the module 76A, 76B respectively 76C.

Unlike the first embodiment, each coupling communication link 80, 81 is a highly secured link, capable of safely guaranteeing the identity of the addressee and the integrity of the data which it transmits.

The method according to the second embodiment of the invention, applied by the module 76B, will now be described.

The three steps 60, 62, 63 which follow are also applied in parallel by the modules 76A, 76C.

Initially, the train 1 is at a standstill and the first memory storage 38 stores both identifiers of the module 76B.

During the initial step 60, the processor 40 for processing messages transmits over the general network 18, via the switch 78B, the non-secured broadcast message including both identifiers of the module 76B.

During the next step 62, the first memory storage 38 of the module 76B receives over the general network 18, via the switch 78B, the identifiers contained in the non-secured broadcast messages from the modules 76A, 76C. The first memory storage 38 then stores these identifiers.

During the next step 63, the processor 40 for processing messages of the module 76B elaborate several secured messages, each secured message including the first identifier or the second identifier of the module 76B and one of the identifiers of a module different from the module 76B. The processor 40 for processing messages thus elaborate a number of secured messages equal to double the number of received identifiers during the preceding step 62. The processor 40 for processing messages transmit, via the switch 78B, over the coupling communication link 80, respectively 81, and over the general network 18, the secured messages including the first identifier, respectively the second identifier, according to a conventional safe transmission mode, of the point-to-point bidirectional link type.

The front, respectively rear, portions of the safety management modules according to this second embodiment are analogous to the front, respectively rear modules of the first embodiment. In return for this substitution, the following steps 64, 66, 68, 70b, 70c, 70d, 70e, 70f, 70g, 72 and 74 are identical with the corresponding steps of the method according to the first embodiment and are therefore not described again.

Alternatively or additionally, the steps 70b, 70c, 70d, 70e, 70f and 70g are also applied in parallel by the modules 76A, 76C.

The method for determining the configuration of the train according to the invention thus gives the possibility of doing without the use of ground equipment.

The description was made with reference to a train including three rolling units. One skilled in the art will nevertheless understand that the invention applies in the same way to a train including a number N of rolling units, N being an integer greater than or equal to two, preferably greater than or equal to four.

What is claimed is:

1. A method for determining a configuration of a train, the train including a plurality of vehicles grouped as successive units connected to each other, including a head unit and a tail unit, the train including safety management devices including one safety management device per unit, each of the safety management devices having two designated identifiers, coupling communication links including one coupling communication link for each pair of adjacent units, each of the coupling communication links only connecting the two safety management devices of the respective pair of adjacent units, and a general network connecting all the safety management devices to each other, the method comprising an initial step of transmitting with each of the safety management devices, over the general network, a non-secured broadcast message including the two designated identifiers, and a step of receiving, with each of the safety management devices, the non-secured broadcast messages transmitted by others of the safety management devices, the method further comprising:

transmitting, over the general network and over a first of the coupling communication links, with a first safety management device of the safety management devices, a secured message to a second safety management device of the safety management devices adjacent to the first safety management device, the secured message including one of the two designated identifiers of the first safety management device;

transmitting, over the general network, with the second safety management device having received the secured message, a restoration message including the two designated identifiers of the first safety management device as well as one of the two designated identifiers of the second safety management device;

receiving, with each of the first safety management device and further ones of the safety management devices other than the first safety management device and the second safety management device, the restoration message transmitted by the second safety management device and other restoration messages transmitted by the further ones of the safety management devices other than the first safety management device and the second safety management device; and determining, with at least the first safety management device, the configuration of the train, by applying a predetermined algorithm within at least the first safety management device, the predetermined algorithm comparing the restoration message and the other restoration messages with the two designated identifiers included in each of the non-secured broadcast messages to determine an order according to which the units are connected to each other.

2. The method according to claim 1, wherein the units include coupling electric couplers with each of the units including two of the coupling electric couplers, each of the coupling electric couplers being capable of detecting that an adjacent one of the units connected to the unit of which the coupling electric coupler is included and wherein, during the determining the configuration of the train, applying the predetermined algorithm further includes:

seeking an assumed tail device and an assumed head device of the train, by identifying two of the safety management devices which are only connected to a single one of the safety management devices via one of the coupling communication links and selecting one of the these two safety management devices as the assumed tail device and one of these two safety management devices as the assumed head device, seeking one of the safety management devices connected to the assumed tail device via one of the coupling communication links, seeking one of the safety management devices connected to the assumed head device via one of the coupling communication links, and validating a completeness of the train, an assumed head unit and an assumed tail unit of the train, respectively corresponding to the assumed head device and the assumed tail device, being confirmed as being the ends of the train by reading the coupling electric coupler of the assumed head device and the coupling electric coupler of the assumed tail device.

3. The method according to claim 2, wherein the safety management devices include safety management modules and each of the safety management devices includes two of the safety management modules, each of the safety management modules being associated with one of the two designated identifiers of the safety management device in which the safety management module is included, during the initial step of transmitting the non-secured broadcast message and during the transmitting the restoration message, the two designated identifiers of the first safety management device being the two designated identifiers of the two safety management modules of the first safety management device.

4. The method according to claim 2, wherein the safety management devices include safety management modules and each of the safety management devices includes one of the safety management modules, each of the safety management modules having the two designated identifiers of the safety management device in which the safety management module is included, during the initial step of transmitting the non-secured broadcast message and during the transmitting the restoration message, the two designated identifiers of the first safety management device being the two designated identifiers of the safety management module of the first safety management device.

5. The method according to claim 1, wherein during the transmitting the restoration message, two of the second safety management device and the further ones of the safety management devices further transmit in parallel over the general network, an additional message including the two of the designated identifiers as well as a value of a variable indicative of a presence or an absence of one of the units being adjacent to the two of the second safety management device and the further ones of the safety management devices.

* * * * *